United States Patent Office 3,417,167
Patented Dec. 17, 1968

3,417,167
METHOD OF PREPARING SPHERICAL URANIUM NITRIDE PARTICLES HAVING A POROUS INTERIOR
Donald E. Kizer and Donald E. Lozier, Columbus, Ohio, assignors to the United States of America as represented by the United States Atomic Energy Commission
No Drawing. Filed Feb. 2, 1968, Ser. No. 702,538
4 Claims. (Cl. 264—.5)

ABSTRACT OF THE DISCLOSURE

A method of preparing spherical uranium nitride particles having a porous interior surrounded by a gas-tight casing comprising melting irregular particles of uranium nitride in a high-temperature plasma flame in a nitrogen atmosphere to partially convert the uranium nitride to uranium, heating the particles thus obtained at a temperature between 700° C. and the melting point of uranium for one to two hours in nitrogen at a pressure lower than that at which $U_2N_3$ is formed, and then heating at about 1400°–1600° C. in nitrogen for a time sufficient to completely nitride the particles.

Contractual origin of the invention

The invention described herein was made in the course of, or under, a contract with the United States Atomic Energy Commission.

Cross references to related applications

This invention is closely related to the process for preparing uranium nitride described in patent No. 3,287,093, dated November 22, 1966 and assigned to the assignee of the present application. This patent discloses a process of preparing uranium mononitride powder wherein uranium shot is first heated in a nitrogen atmosphere at a temperature below the melting point of uranium to form a casing of uranium nitride on the shot, nitriding is completed at a temperature above the melting point of uranium and the nitrided product is ball milled. While the procedure described in the patent is related to that employed in following the present invention, due to certain critical distinctions, the product attained is different. The critical parameters of the process of the present invention will become apparent hereinafter upon further perusal of the specification.

Background of the invention

This application relates to the preparation of fuel for a nuclear reactor. In more detail, the invention relates to the preparation of fuel consisting of spherical uranium mononitride particles wherein said particles include a gas-tight casing surrounding a porous interior.

Ceramic compounds such as uranium mononitride have such chemical, physical and nuclear properties as to be exceptionally well suited for use as fuel for nuclear reactors. While development of uranium mononitride as a fuel material has not proceeded to the same extent as that of other ceramic compounds—notably uranium dioxide—it appears quite probable that it will be selected as the fuel material for a reactor to be built in the future.

While it is in general desirable that reactor fuel be as dense as possible to obtain a high concentration of fissionable material in the core of the reactor, it is also essential that some provision be made for accumulation of gaseous fission products to prevent rupture of the cladding conventionally employed to protect the fuel. This is conventionally accomplished by extending the cladding above the top of the fuel to provide a plenum for fission gases within the cam. This is undesirable because lengthening of the fuel element increases the pressure drop of coolant flowing through the core. Accordingly it would be desirable to provide uniformly distributed space within the fuel for the fission gases while retaining a high-density fuel.

Summary of the invention

According to the present invention, irregular particles of uranium nitride are passed through a plasma flame in a nitrogen atmosphere to melt the particles which causes the partial dissociation of the uranium nitride to uranium. The resulting spherical particles are heated at a temperature below the melting point of uranium under a nitrogen pressure insufficient to form $U_2N_3$ for a time sufficient to form a casing of uranium mononitride on the particle but insufficient to nitride the interior of the particle. The temperature is then increased to 1400°–1600° C. and nitriding is continued until the particles are completely nitrided. The particles thus formed are stoichiometric uranium mononitride and include a gas-tight casing surrounding a porous interior.

Description of the preferred embodiment

Irregular uranium mononitride particles are melted in the flame of a low-velocity, D.C., gas plasma torch in a system which has been evacuated and backfilled with one atmosphere of nitrogen. The size of the particles is not critical but they should be roughly of the same size. The plasma temperature, the dwell time of the particles in the flame and the composition of the gas used in the plasma torch all affect the final product and thus constitute important features of this invention.

For best results the flame temperature should be held between about 15,000 and 20,000° K., the dwell time should be about 3 to 10 microseconds and 100% nitrogen should be supplied to the plasma torch and argon should be supplied to the feeder for the uranium nitride as carrier gas to maintain a free-flowing powder into the flame. Exact parameters are best established by examining the spherical particles obtained from the plasma flame visually and metallographically and adjusting the listed parameters to obtain the desired product. The temperature of the plasma flame and the dwell time of the particles in the plasma flame must be adjusted so that the particles just melt and assume a spherical shape while undergoing partial decomposition. If the flame is too hot or the particles remain in the flame too long, decomposition of the uranium nitride will proceed to the point where subsequent nitriding will not result in a particle having a porous interior inside of a gas-tight casing. A simple metallographic examination to determine that a uranium nitride phase is present in the spherical particles suffices. It is believed that around 10 to 60% of the uranium nitride in the particle should be converted to uranium in the plasma flame. The temperature of the plasma flame is readily controlled by controlling the power input to the plasma and the dwell time in the flame is controlled by controlling the feed rate of the uranium nitride particles.

It is essential that the heat content of the plasma flame be obtained from nitrogen rather than from other gases since other gases have proven unsatisfactory. It is desirable to employ a nitrogen atmosphere in the system to prevent exposure of the particles to oxygen since a very pure product is desired. In addition, the nitrogen present in the system tends to prevent complete dissociation of the uranium nitride to uranium.

The particles thus prepared are then heated in a nitrogen atmosphere at a temperature below the melting point of uranium for a time sufficient to form a thin casing of uranium nitride around the particles without nitriding the interior of the particles. This heat treatment should be carried out at a temperature between 700° C. and the melting point of uranium, and preferably between 900 and 1100° C., in nitrogen at a pressure lower than that given by the formula $$\text{Log } P_{N_2} = \frac{-11,850}{T(°K.)} + 7.3226$$

and above that given by the formula $$\text{Log } P_{N_2} = \frac{-30,800}{T(°K.)} + 9.08$$

where P is the nitrogen pressure and T is the temperature. A very dense and impervious layer of uranium nitride several microns thick is thus formed on the particles. If a higher pressure is used—as in the above-cited Nelson et al. patent—at least a little $U_2N_3$ will be formed which will reduce the impermeability of the uranium nitride casing and which may spall off as a dust. While this can be tolerated for the utility specified in the patent, it cannot be tolerated where the ultimate product is a sound spherical particle having a gas-tight casing.

The temperature is then increased to 1400–1600° C. and the particles are heated at this temperature in nitrogen at a pressure anywhere between $5 \times 10^{-7}$ and 1 atmosphere for a time sufficient to complete the nitridation. The lower limit on pressure is the nitrogen pressure required for the nitrogen to diffuse into the particles and the upper limit is the pressure at which $U_2N_3$ forms at these temperatures. The total time required, of course, depends on the size of the particles as well as on the amount of free uranium present in the particles and the density of the particles. Due to the impermeability of the casing, a relatively long time is required. For example, 50 to 100 hours are required to nitride −80 +100 mesh particles which were spheroidized in a plasma flame as described above. While increasing the temperature from the minimum to the maximum, the temperature should be held at intermediate levels for a short period of time to permit healing of the casing in the event it ruptures and molten uranium leaks out of the particle. Holding the temperature at 1300° C. for one hour and at 1400° C. for another hour would be satisfactory.

Practically, a nitrogen pressure intermediate the extremes theoretically possible should be used and a pressure of 200 mm. of mercury would be satisfactory.

Example

Metallic uranium is nitrided by the uranium-nitrogen gas reaction and a −80 +100 mesh fraction (0.175 to 0.147 mm.) is spheroidized in a nitrogen plasma flame having a temperature between 15,000 and 20,000° K. using a 100% nitrogen supply to the plasma torch and supplying argon gas to the feeder. The spheroidized particles obtained thereby are heat treated at 900° C. for two hours under five mm. of mercury nitrogen pressure. The temperature is then increased to 1300° C. while increasing the nitrogen pressure to 200 mm. of mercury and the particles are held at this temperature for an hour. The temperature is increased to 1400 C. and this temperature is held for an hour. Finally, the temperature is increased to 1600° C., which temperature is held for 78 hours.

Uranium nitride spheroids prepared in accordance with this process have been analyzed and contain between 5.53 and 5.6 weight percent nitrogen (stoichiometric uranium mononitride contains 5.56 weight percent nitrogen). Photomicrographs show that the particles contain 5 to 20% void space distributed uniformly through the interior of the particles.

It will be understood that the invention is not to be limited to the details given herein but that it may be modified within the scope of the appended claims.

The embodiments of the invention in which an exclusive property or privilege is claimed are defined as follows:

1. A method of preparing uranium mononitride particles having a porous interior and a gas-tight casing comprising passing uranium mononitride particles through a plasma flame in a nitrogen atmosphere, the temperature of the flame and the dwell time of the particles in the flame being such as to spheroidize the particles and partially denitride them, heating the resulting spherical particles at a temperature between 700° C. and the melting point of uranium under a nitrogen pressure lower than that given by the formula $$\text{Log } P_{N_2} = \frac{-11,850}{T(°K.)} + 7.3226$$

and above that given by the formula $$P_{N_2} = \frac{-30,800}{T(°K.)} + 9.08$$

where P is the nitrogen pressure and T is the temperature for a time sufficient to form a casing of uranium mononitride on the particles, and continuing heating the particles in an atmosphere of nitrogen under a pressure between $5 \times 10^{-7}$ atm. and 1 atm. at up to 1600° C. until the particles are completely nitrided to uranium mononitride.

2. A method according to claim 1 wherein the feed material is −80 to +100 mesh uranium mononitride, the temperature of the plasma flame is 15,000 to 20,000° K., the dwell time of the particles in the plasma flame is 3 to 10 microseconds, the plasma flame system is filled with nitrogen to a pressure of one atmosphere and the gas feed to the plasma flame is 100% nitrogen.

3. A method according to claim 2 wherein the initial heating is at 900 to 1100° C. for one to two hours in nitrogen at a pressure of 5 mm.

4. A method according to claim 3 wherein the continued heating is at a nitrogen pressure of 200 mm. for one hour at 1300° C., one hour at 1400° C. and 78 hours at 1600° C.

References Cited

UNITED STATES PATENTS

| | | | |
|---|---|---|---|
| 3,287,093 | 11/1966 | Nelson et al. | 23—347 |
| 3,178,259 | 4/1965 | Foster et al. | 23—347 |
| 3,171,714 | 10/1962 | Jones et al. | 264—.5 |

CARL D. QUARFORTH, *Primary Examiner.*

M. J. McGREAL, *Assistant Examiner.*

U.S. Cl. X.R.

252—30.1; 23—347; 264—15